United States Patent
Choi

(10) Patent No.: US 11,659,049 B2
(45) Date of Patent: May 23, 2023

(54) DEVICE AND METHOD FOR REMOTE DEVICE PROFILE MANAGEMENT/IDENTIFICATION FOR INTELLIGENT DISCOVERY

(71) Applicant: ELECTRONICS AND TELECOMMUNICATIONS RESEARCH INSTITUTE, Daejeon (KR)

(72) Inventor: Younghwan Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 17/729,788

(22) Filed: Apr. 26, 2022

(65) Prior Publication Data

US 2022/0345534 A1  Oct. 27, 2022

(30) Foreign Application Priority Data

Apr. 27, 2021 (KR) .................. 10-2021-0054356
Jul. 14, 2021 (KR) .................. 10-2021-0092478
Nov. 19, 2021 (KR) .................. 10-2021-0160454

(51) Int. Cl.
*H04L 67/51* (2022.01)
*H04L 67/303* (2022.01)
*H04L 67/10* (2022.01)

(52) U.S. Cl.
CPC ............ *H04L 67/303* (2013.01); *H04L 67/10* (2013.01); *H04L 67/51* (2022.05)

(58) Field of Classification Search
CPC ........ H04L 67/303; H04L 67/10; H04L 67/51
See application file for complete search history.

(56) References Cited

U.S. PATENT DOCUMENTS

| | | | |
|---|---|---|---|
| 9,602,602 B2 | 3/2017 | Choi et al. | |
| 10,104,038 B2 | 10/2018 | Choi et al. | |
| 10,524,096 B2 | 12/2019 | Choi | |
| 10,887,394 B2* | 1/2021 | Dong | H04L 45/22 |
| 11,178,185 B2* | 11/2021 | Ojha | H04W 40/12 |
| 2008/0049644 A1* | 2/2008 | Halbert | H04L 41/12 370/254 |
| 2017/0272507 A1* | 9/2017 | Hotchkiss | H04L 67/51 |
| 2020/0067915 A1 | 2/2020 | Kumar et al. | |
| 2021/0005330 A1 | 1/2021 | Patil et al. | |

FOREIGN PATENT DOCUMENTS

| | | |
|---|---|---|
| KR | 101426012 B1 | 8/2014 |
| KR | 10-2019-0088878 A | 7/2019 |

* cited by examiner

*Primary Examiner* — Bryan Lee

(57) ABSTRACT

Device and method for remote device profile management/identification for intelligent discovery are disclosed. A remote device profile management method for service interworking may include receiving a request to register a device profile of a local device for a cloud network, generating a regular profile identification (ID) for the device profile, registering a record including the regular profile ID along with ID and connection information of a device registry in which the local device is registered, and registering a record including the regular profile ID and the device profile.

1 Claim, 10 Drawing Sheets

Example records of Tables

- DATA EXAMPLE of PROFILE MANAGER (NAME: T_DEV_PF)
  - DEV_PF #1 (#ID)
    - #FUNC1
  - DEV_PF #2
    - #FUNC2
    - #FUNC3
  - DEV_PF #3
    - #FUNC2
    - #FUNC4

- SERVICE PROFILE MATCHING TABLE of PROFILE MANAGER (NAME: T_SER_PF)
  - #SERVICE1
    - #FUNC1
    - #FUNC2
    - #FUNC3
  - #SERVICE2
    - #FUNC2
    - #FUNC3
  - #SERVICE3
    - #FUNC1
    - #FUNC3
    - #FUNC4
  - #SERVICE...
    - #FUNC...
    - #FUNC...
    - ...

FIG. 7

DEVICE AND METHOD FOR REMOTE DEVICE PROFILE MANAGEMENT/IDENTIFICATION FOR INTELLIGENT DISCOVERY

CROSS-REFERENCE TO RELATED APPLICATIONS

This application claims the priority benefit of Korean Patent Application No. 10-2021-0054356 filed on Apr. 27, 2021, Korean Patent Application No. 10-2021-0092478 filed on Jul. 14, 2021, and Korean Patent Application No. 10-2021-0160454 filed on Nov. 19, 2021, in the Korean Intellectual Property Office, the disclosures of which are incorporated herein by reference for all purposes.

BACKGROUND

1. Field of the Invention

One or more example embodiments relate to a technology for device profile identification and management required for efficient discovery of a remote device connected with a cloud for interworking with an Internet of things (IoT) device.

2. Description of the Related Art

With the development of the Internet and the establishment of Internet of things (IoT) using ICT convergence services (for example, IoT-based services such as IoT-based blockchain technology convergence service and IoT-based artificial intelligence convergence service) as an essential base technology, a hyper-connection technology of IoT is also being used as an essential concept. In addition, an IoT technology is evolving into "autonomous IoT" beyond "intelligent IoT."

"Hyper-connection of IoT" is divided into connection between local devices within the same network range and connection with a remote device existing on the Internet (or cloud), and includes the two types of connection.

The above-described background technology is possessed or acquired by the inventor in a derivation process of the present invention, and is not necessarily a known technology disclosed to the general public prior to filing of the present application.

SUMMARY

Connection between local devices (for example, local discovery) and connection with a remote device (for example, remote discovery), which relate to a "technology for identifying device information for connection between devices (for example, a device profile) by allowing a server device to manage the device information as simple data," may enable mutual discovery between devices. Local discovery and remote discovery may focus on such a simple type of discovery procedure using the device information (or a profile). Local discovery and remote discovery may simply focus on discovering a target device through information exchange with a server that manages device information, or focus on a mutual authentication method in a discovery process. An essential technology to evolve into autonomous IoT, that is, a "detailed technology on how to segment and manage a device profile to efficiently identify the device profile," may not be solved with conventional technologies.

Example embodiments provide an essential additional technology for intelligent device discovery, and an apparatus and method for the essential additional technology.

Example embodiments may include additional three essential detailed technologies for device intelligent discovery, that is, "(1) a profile segmentation method for intelligent discovery, (2) a profile management and registration method, and (3) an identification method and procedure for efficient discovery."

However, technical issues are not limited to the above-described technical issues, and other technical issues may exist.

Example embodiments provide a remote device profile management method for service interworking, the remote device profile management method may include receiving a request to register a device profile of a local device for a cloud network, generating a regular profile identification (ID) for the device profile, registering a record including the regular profile ID along with ID and connection information of a device registry in which the local device is registered, and registering a record including the regular profile ID and the device profile.

The remote device profile management method may further include sending a confirmation message notifying that registration is complete, after registration of the device profile for the cloud network is completed.

The remote device profile management method may further include updating a profile ID of the device profile stored in the device registry from tentative to regular in response to the confirmation message.

The remote device profile management method may further include verifying whether the local device is in an active state through a timer for the local device.

The remote device profile management method may further include transmitting a discovery request message to the local device whenever the timer expires.

The remote device profile management method may further include resetting the timer when a discovery response message is received from the local device in response to the discovery request message.

The remote device profile management method may further include performing deregistration of the device profile for the cloud network, when a profile deregistration message is received, or when no discovery response message is received from the local device.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which:

FIGS. 7 and 8 are diagrams illustrating an example of an operation of discovering a device profile according to example embodiments;

DETAILED DESCRIPTION

Figure 1:
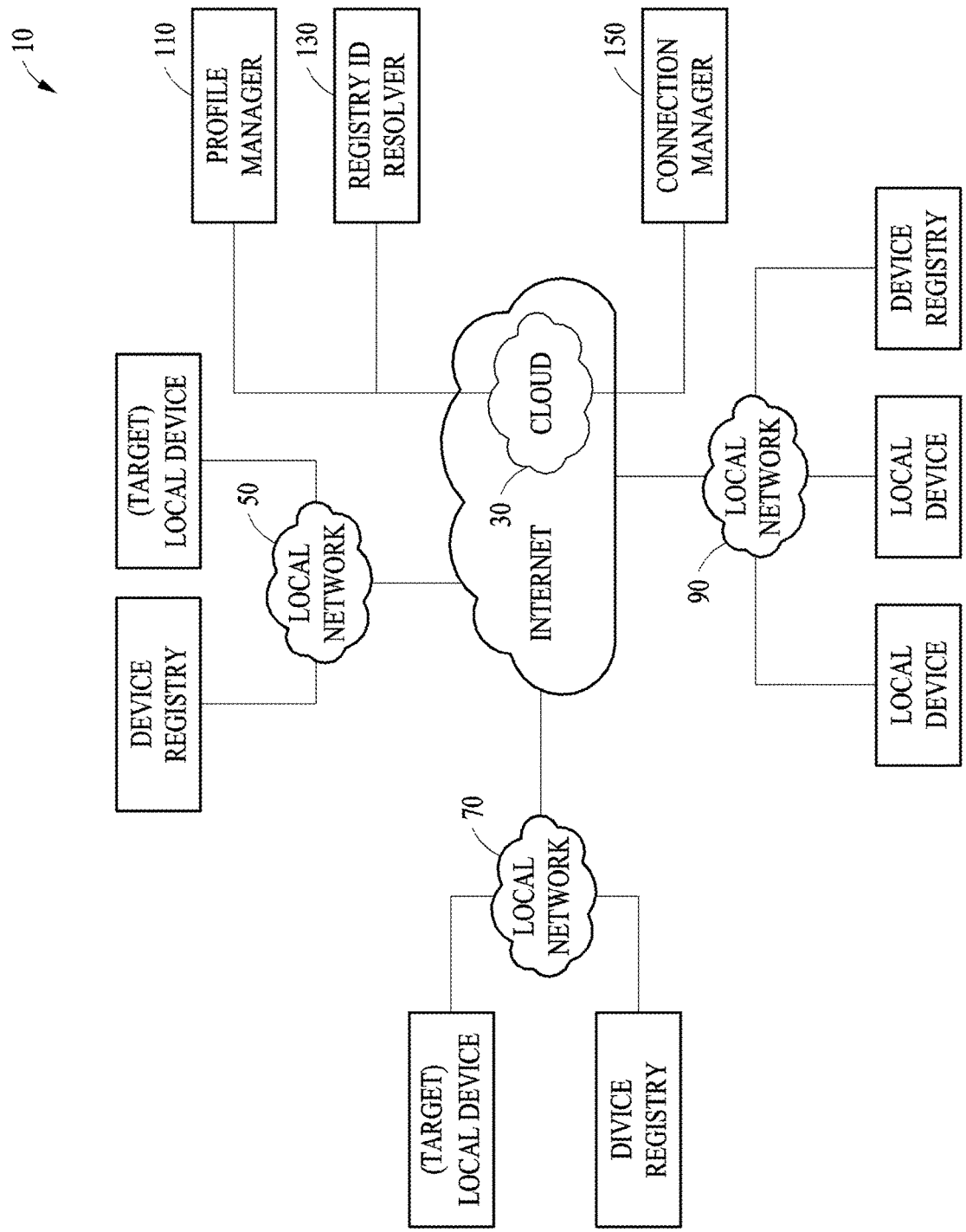
FIG. 1 is a diagram illustrating a service discovery framework according to example embodiments.

The following structural or functional descriptions of example embodiments described herein are merely intended for the purpose of describing the example embodiments described herein and may be implemented in various forms. Here, the example embodiments are not construed as limited to the disclosure and should be understood to include all changes, equivalents, and replacements within the idea and the technical scope of the disclosure.

Although terms of "first," "second," and the like are used to explain various components, the components are not limited to such terms. These terms are used only to distinguish one component from another component. For example, a first component may be referred to as a second component, or similarly, the second component may be referred to as the first component within the scope of the present disclosure.

When it is mentioned that one component is "connected" or "accessed" to another component, it may be understood that the one component is directly connected or accessed to another component or that still other component is interposed between the two components.

As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

Hereinafter, example embodiments will be described in detail with reference to the accompanying drawings. When describing the example embodiments with reference to the accompanying drawings, like reference numerals refer to like components and a repeated description related thereto will be omitted.

FIG. 1 is a diagram illustrating a service discovery framework according to example embodiments.

Referring to FIG. 1, according to example embodiments, a service discovery framework 10 may include a plurality of entities (for example, centralized entities) within a cloud network 30 and a plurality of entities (for example, distributed entities) within a local network 50 and 70, or 90. The service discovery framework 10 may relate to a service framework for interworking with device discovery and device management in a heterogeneous IoT environment. Device discovery may refer to an operation of requesting and acquiring information on any device (for example, a target device) for service interworking. A device discovery operation may include device discovery (for example, local device discovery) that exists in the local network 50, 70, or 90 on the same subnet and device discovery (for example, remote device discovery) that exists outside the same subnet. Local device discovery may enable rapid discovery in the same manner as broadcasting. However, remote device discovery may require an additional apparatus and function for device identification. The service discovery framework 10 may include a cloud-based device profile management and identification method for remote device discovery.

According to example embodiments, the local networks 50, 70, and 90 are connected based on the Internet, and the distributed entities may be connected. The distributed entities may include a local device and a device registry. The local device may have functions that are usable for services, and function information on the functions included in the local device may be referred to as a device profile. The device registry may collectively manage connection information and discovery information on one or more local devices included in each of the local networks 50, 70, and 90. The distributed entities (for example, a local device and a device registry) connected with each of the local networks 50, 70, and 90 may be operated by different service providers.

According to example embodiments, the cloud network 30 may include centralized entities. The centralized entities may include a profile manager 110, a registry ID resolver 130, and a connection manager 150. The profile manager 110 may be configured to manage a device profile, the registry ID resolver 130 may be configured to support identification of a discovered device (for example, a device profile), and the connection manager 150 may be configured to manage connection of the discovered device (for example, a device profile). The profile manager 110, the registry ID resolver 130, and the connection manager 150 may belong to one cloud, that is, the cloud network 30, and may be operated by the same service provider (for example, a single cloud service provider). The profile manager 110, the registry ID resolver 130, and the connection manager 150 may be implemented as a hardware device (for example, a server device).

According to example embodiments, the profile manager 110 may support discovery (for example, intelligent discovery) through intelligent context-awareness (for example, an intelligent context-aware mechanism) of a managed device profile (for example, a harmonized device profile). The profile manager 110 may include a plurality of databases (DB) (DB DEVICE_PROFILE and DB SERVICE_PROFILE) (for example, a data structure) for service and function type matching for intelligent context-awareness. The plurality of databases may include a first database (DB DEVICE_PROFILE) for a device profile and a second database (DB SERVICE_PROFILE) for a service profile. When a local device appears in the local network 50, 70, or 90, the profile manager 110 may register a device profile for the local device in the first database (DB DEVICE_PROFILE) through a registration procedure. The first database (DB DEVICE_PROFILE) may register and store the device profile of the local device connected with each of the local network 50, 70, and 90. The second database (DB SERVICE_PROFILE) may register and store the service profile.

The service profile may be established in advance without a registration procedure. When the local device requests a device profile of a target local device for service interworking through a discovery procedure, the profile manager 110 may provide (for example, transmit), to the requesting local device, information on one or more device profiles corresponding to the target local device. In this case, the profile manager 110 may match device profiles stored in the first database (DB DEVICE_PROFILE) with service profiles stored in the second database (DB SERVICE_PROFILE), thereby extracting, from the device profiles stored in the first database (DB DEVICE_PROFILE), information on one or more device profiles that may be the target local device.

Table 1 may represent a device profile stored in the first database (DB DEVICE_PROFILE). The device profile may include two attributes (for example, attribute information). The two attributes may include an ID of the device profile (data type: unsigned numeric) and a name of a function (data type: string). The function may refer to function information provided by a local device.

TABLE 1

| DATABASE: DEVICE_PROFILE | | |
| --- | --- | --- |
| (TYPE_INT) | PROFILE_ID | # ID of Device Profile |
| (TYPE_STRING) | FUNCTION_NAME | # Name of Function |

Table 2 may represent a service profile stored in the second database (DB SERVICE_PROFILE). The service profile may include two attributes (for example, attribute information or attribute item). The two attributes may include a name of a service (for example, a name of a service profile) (data type: string) and a name of a function (data type: string) (for example, a function required for a corresponding service). The service profile, which is a profile of a service, may be a list of functions required for the service (for example, service interworking).

TABLE 2

| DATABASE: SERVICE_PROFILE | | |
| --- | --- | --- |
| (TYPE_STRING) | SERVICE_NAME | # Name of Service |
| (TYPE_STRING) | FUNCTION_NAME | # Name of Function |

According to example embodiments, the registry ID resolver 130 may interpret identification information (for example, an ID) of a device profile of a target local device that is a discovery target to provide connection information (or location information) (for example, a uniform resource locator (URL) of a device registry (for example, a device registry registered in the registry ID resolver 130) connected with the target local device. The registry ID resolver 130 may include a database (DB REGISTRY) (for example, a data structure) for managing the device registry. The database (DB REGISTRY) may store device registry information. Table 3 may represent device registry information stored in the database (DB REGISTRY). The device registry information may include a plurality of attributes (for example, attribute information or attribute item). The plurality of attributes may include an ID of the device registry (data type: unsigned numeric), connection information on the device registry (data type: string), and an ID of the device profile (data type: unsigned numeric) (for example, an ID of a device profile of a local device registered in the device registry).

TABLE 3

| DATABASE: REGISTRY | | |
| --- | --- | --- |
| (TYPE_INT) | REGISTRY_ID | # ID of Registry |
| (TYPE_STRING) | REGISTRY_URL | # URL of Registry |
| (TYPE_INT) | PROFILE_ID | # ID of Device Profile |

According to example embodiments, the connection manager 150 may monitor in real time whether connection with each function of a device profile of a target local device that is a discovery target is available, and provide whether additional connection (for example, next connection) is available. When connection with the target local device is completed after a discovery procedure is completed, the connection manager 150 may register whether additional connection with a function of the device profile of the target local device is available. In addition, when the target local device is new (for example, new registration), and it is desired to exclude to additional connection with a function of the target local device, the connection manager 150 may preset, as unavailable, whether additional connection with the function of the target local device is available. The connection manager 150 may include a database (DB AVAILABLE_CONNECTION) (for example, a data structure) for connection information on the target local device. Table 4 may represent connection information stored in the database (DB AVAILABLE_CONNECTION). The connection information may include a plurality of attributes (for example, attribute information or attribute item). The plurality of attributes may include an ID of the device profile (data type: unsigned numeric) (for example, an ID of the device profile of the target local device), a name of a function (data type: string) (for example, the function of the target local device), and availability for next connection (data type: bool (TRUE/FALSE)) (for example, whether additional connection with the function is available).

TABLE 4

| DATABASE: AVAILABLE_CONNECTION | | |
| --- | --- | --- |
| (TYPE_INT) | PROFILE_ID | # ID of Device Profile |
| (TYPE_STRING) | FUNCTION_NAME | # Name of Function |
| (TYPE_BOOL) | AVAILABLE | # Availability for Next Connection |

According to example embodiments, a device registry may discover a local device existing on the same local network 50, 70, or 90 (for example, the same subnet), register device information on the local device, and register a device profile of a newly registered local device in entities (for example, the profile manager 110, the registry ID resolver 130, or the connection manager 150) within the cloud network 30. In addition, during a discovery procedure, the device registry may provide information on connection of a profile device of a discovery target (for example, a target local device). The device registry may use a timer to maintain up-to-date information on the local device. The device registry may verify, through the timer, whether the registered local device is in an active state when a predetermined period of time lapses. The device registry may include a database (DB DEVICE) (for example, a data structure) for storing device information. Table 5 may represent the device information stored in the database (DB DEVICE). The device information may include a plurality of attributes (for example, attribute information or attribute item). The plurality of attributes may include a device ID of the local device (data type: unsigned numeric), connection information of the local device (data type: string) (for example, URL), an ID of the device profile (data type: unsigned numeric), and the timer (data type: unsigned numeric).

TABLE 5

DATABASE: DEVICE

| (TYPE_INT) | DEVICE_ID | # ID of Local Device |
| (TYPE_STRING) | DEVICE_URL | # URL of Local Device |
| (TYPE_INT) | PROFILE_ID | # ID of Device Profile |
| (TYPE_INT) | TIMER | # Timer |

According to example embodiments, a local device may refer to a device capable of single-hop networking connected on the same local network 50, 70, or 90 (for example, the same subnet), and may be registered in a device registry of the same local network 50, 70, or 90. The local device may respond with connection information thereof to a discovery request from the device registry during a discovery procedure of another local device. The local device may include a database (DB DEVCIE_PROFILE) (for example, a data structure) for storing a device profile. Table 6 may represent a device profile stored in the database (DB DEVICE_PROFILE). The device profile may include a plurality of attributes (for example, attribute information or attribute item). The plurality of attributes may include a name of a function (data type: string) of the local device, a type of function (data type: TYPE_FUNC), and a remaining connection resource (data type: unsigned numeric). Table 7 may represent the type of function (TYPE_FUNC), and the type of function (TYPE_FUNC) may be divided into three types: a sensor type (TYPE_SENSOR), an actuator type (TYPE_ACTUATOR), and a processor type (TYPE_PROCESSOR).

TABLE 6

DATABASE: DEVICE PROFILE (#ID)

| (TYPE_STRING) | FUNC_NAME | # Name of Function |
| (TYPE_FUNC) | FUNC_TYPE | # Type of Function |
| (TYPE_INT) | REMAINING_RES | # Remaining Connection Resources |

TABLE 7

DATA TYPE: TYPE_FUNC

| TYPE_SENSOR | # Type of Sensors |
| TYPE_ACTUATOR | # Type of Actuators |
| TYPE_PROCESSOR | # Type of Processor_ |

Figure 2:
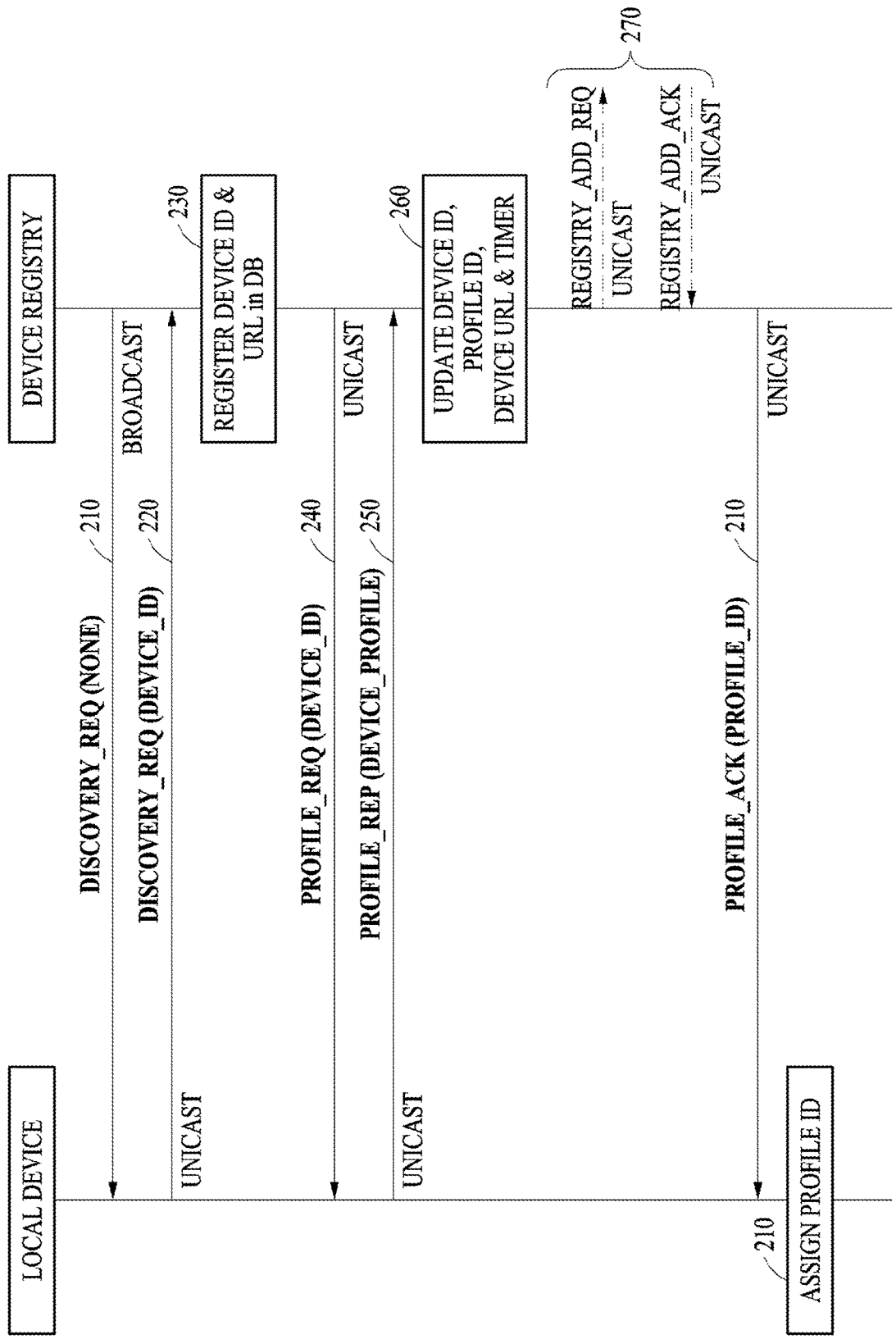
FIG. 2 is a diagram illustrating local device registration according to example embodiments.

FIG. 2 is a diagram illustrating local device registration according to example embodiments.

In FIG. 2, a local device registration procedure may include local device registration and profile cloud registration. In FIG. 2, the local device registration procedure may represent a registration operation between a local device and a device registry in the same local network.

In operation 210, the device registry may broadcast a discovery request message (DISCOVERY_REQ(NONE)) for discovering a local device (for example, an unknown local device) within the local network 50, 70, or 90 (for example, the same subnet) on the same local network (50, 70, or 90) (for example, the same subnet).

In operation 220, a local device that receives the discovery request message (DISCOVERY_REQ(NONE)) may send, to the device registry, a discovery response message including a device ID thereof (DISCOVERY_REP(DEVICE_ID)) (for example, a unicast message).

In operation 230, the device registry may receive the discovery response message (DISCOVERY_REP(DEVICE_ID)), and may register, in a database (DB DEVICE), a record (for example, a record corresponding to the local device) including the device ID and connection information (for example, URL) of the local device.

In operation 240, the device registry may transmit, to a registered (or newly registered) local device, a profile request message (PROFILE_REQ(DEVICE_ID)) (for example, a unicast message) for requesting a device profile.

In operation 250, the corresponding local device (for example, a local device newly registered in the device registry) may send, to the device registry, a profile response message (PROFILE_REP(DEVICE_PROFILE)) including a device profile in response to the profile request message (PROFILE_REQ(DEVICE_ID)). The device profile may include a first profile ID (for example, a tentative profile ID) and a function name. The local device may have an ID (for example, the same single ID) for one or more device profiles, and may include a plurality of functions.

In operation 260, the device registry may register (for example, update) a device profile and a timer in a record matching the device ID stored in the database (DB DEVICE). The device profile may include a first profile ID (for example, a tentative profile ID) and a function name. The local device may have an ID (for example, the same single ID) for one or more device profiles, and may include a plurality of functions. In the record, the timer may be set for a predefine period of time.

In operation 270, the device registry may start a registration operation (for example, REGISTRY_ADD_REQ, and REGISTRY_ADD_ACK) of the device profile for the cloud network 30. When the registration operation for the cloud network 30 is completed, an ID of the device profile may be determined as a second profile ID (for example, a regular profile ID) for the local device, and the device registry may finally register (for example, update) the second profile ID in the database (DB DEVICE).

In operation 280, the device registry may transmit, to the local device, a profile confirmation message (PROFILE_ACK(PROFILE_ID)) including the second profile ID.

In operation 290, the local device may receive and store the second profile ID allocated for a device profile thereof.

Figure 3:
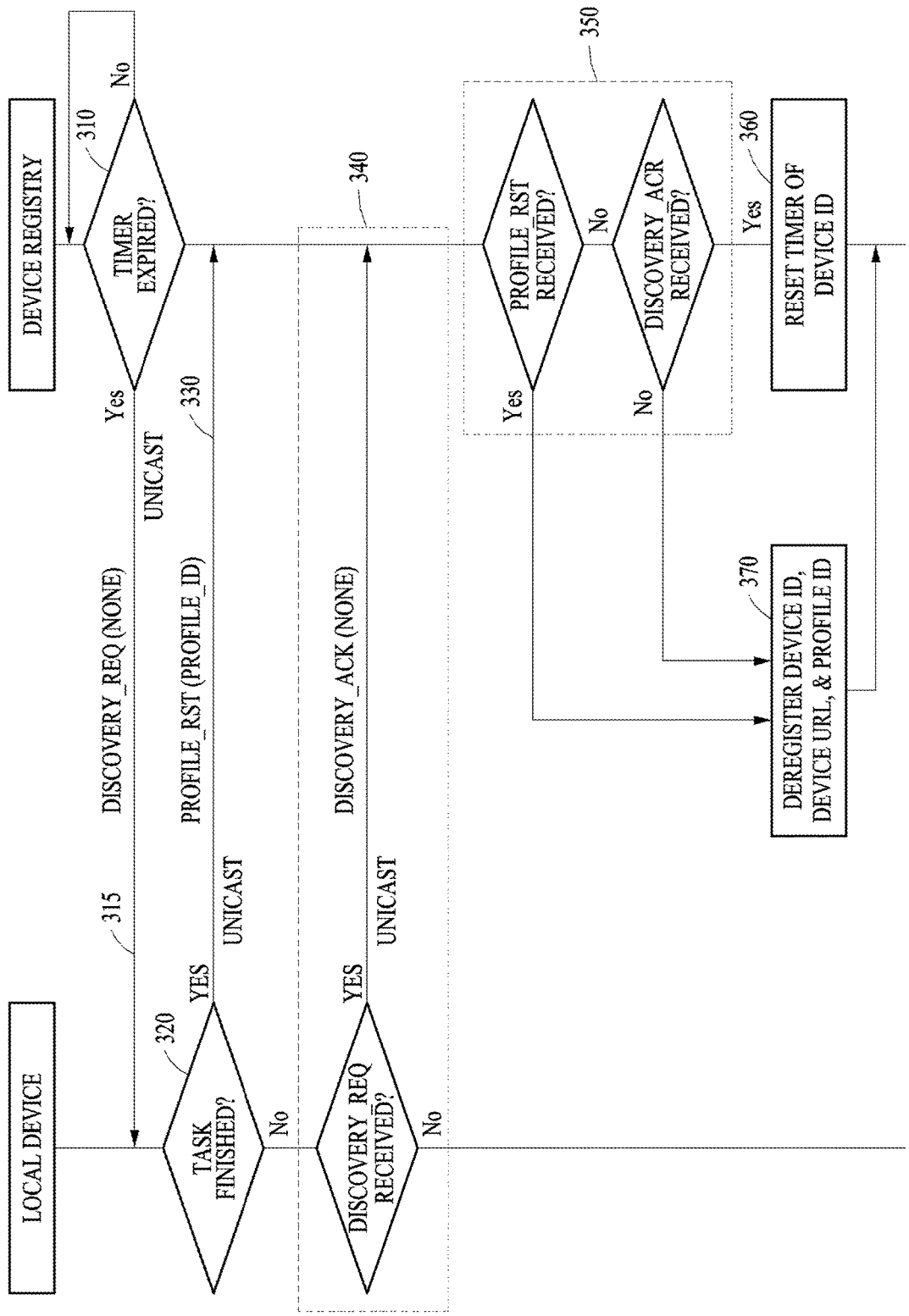
FIG. 3 is a diagram illustrating an operation of updating/deactivating a local device according to example embodiments.

FIG. 3 is a diagram illustrating an operation of updating/deactivating a local device according to example embodiments.

FIG. 3 may illustrate an updating/deactivating operation between a local device registered in a local network and a device registry. The updating/ deactivating operation may be performed when the registered local device disappears or is not capable of interworking.

In operation 310, the device registry may verify whether a timer set for the registered local device expires or is out (for example, is updated).

In operation 315, whenever the timer set for the registered local device expires (for example, is updated), the device registry may periodically (or regularly) unicast a discovery request message (DISCOVERY_REQ(NONE)) to the corresponding local device.

In operation 320, the local device may determine whether to finish a task (for example, whether to finish interworking)

in response to the discovery request message (DISCOVERY_REQ(NONE)). The local device may determine to finish interworking at a time point when the local device is deactivated because the local device is not capable of performing a task.

In operation 330, when interworking is finished, local devices 600, 610, 620, and 630 may transmit, to the device registry, a profile deregistration message (PROFILE_RST (PROFILE_ID)) (for example, a unicast message) for deregistration. The profile deregistration message (PROFILE_RST(PROFILE_ID)) may include a profile ID (for example, a second profile ID).

In operation 340, when interworking is not finished, the local device may transmit, to the device registry, a discovery response message (DISCOVERY_ACK(NONE)) so as to convey that the local device is still activated.

In operation 350, the device registry may confirm reception of the profile deregistration message (PROFILE_RST (PROFILE_ID)) or the discovery response message (DISCOVERY_ACK(NONE)).

In operation 360, when the discovery response message (DISCOVERY_ACK(NONE)) is received, the device registry may reset the timer for a predefined specific period of time of a corresponding record (for example, a local device).

In operation 370, when the profile deregistration message (PROFILE_RST(PROFILE_ID)) is received, the device registry may deregister (for example, remove or delete) a record corresponding to the profile ID from a database. In addition, even when the profile deregistration message (PROFILE_RST(PROFILE_ID)) and/or the discovery response message (DISCOVERY_ACK(NONE)) are/is not received, the device registry may deregister (for example, remove or delete) the record corresponding to the profile ID from the database. The device registry may perform a deregistration operation on an entity existing in the cloud network 30.

Figure 4:
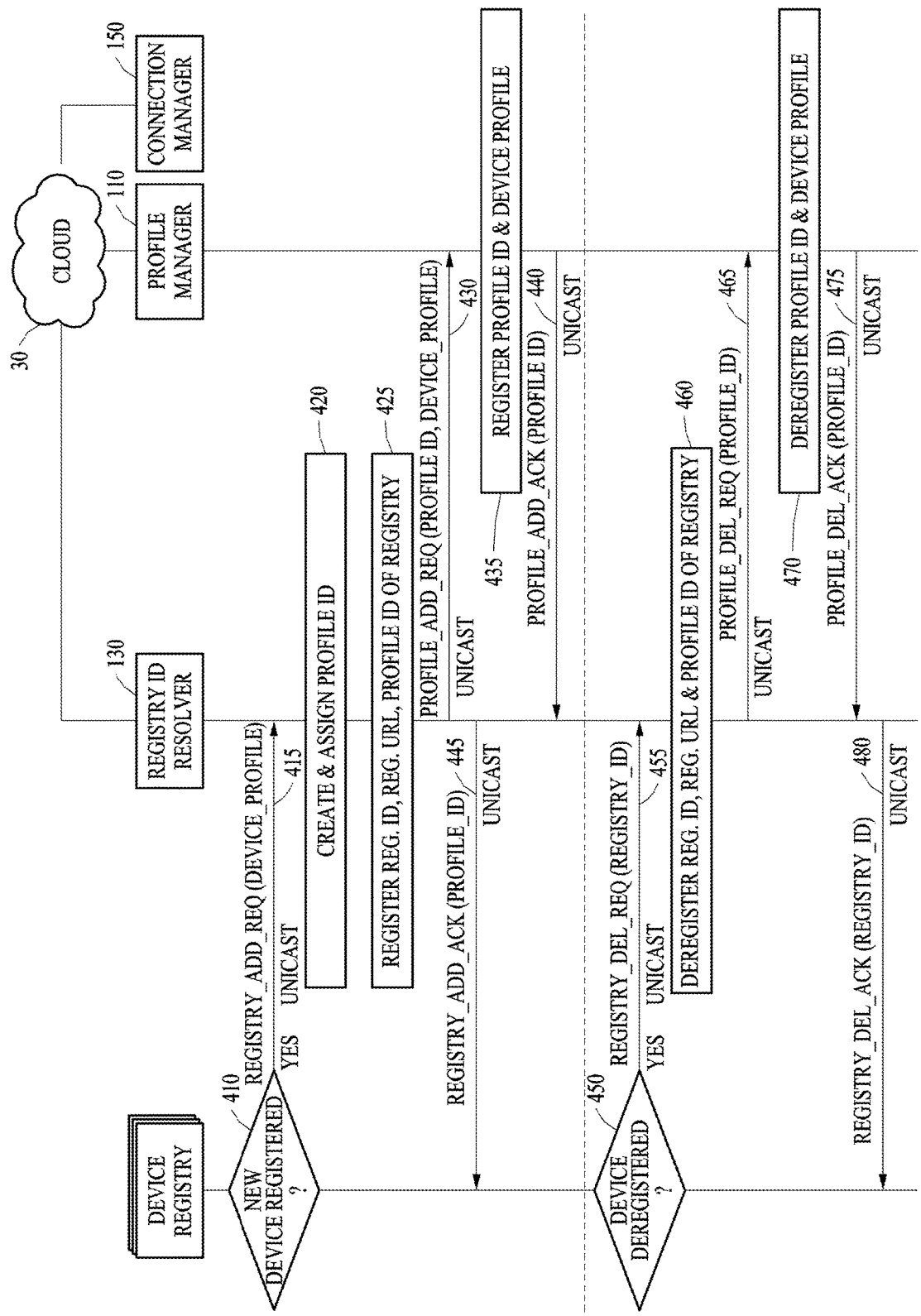
FIG. 4 is a diagram illustrating an operation of registering/deactivating a device profile for a cloud network according to example embodiments.

FIG. 4 is a diagram illustrating an operation of registering/deregistering a device profile for a cloud network according to example embodiments.

A device profile registration operation may include operations 410 to 445. The device profile registration operation may be performed every time point when a local device is newly registered in a device registry.

In operation 410, the device registry may verify whether a local device that joins the local network 50, 70, or 90 for interworking is newly registered in the database (DB DEVICE).

In operation 415, every time point when the local device is newly registered, the device registry may transmit, to the registry ID resolver 130, a registry addition request message (REGISTRY_ADD_REQ(DEVICE_PROFILE)). The registry addition request message (REGISTRY_ADD_REQ (DEVICE_PROFILE)) may include an ID of the device registry and a device profile of the newly registered local device.

In operation 420, the registry ID resolver 130 may generate and allocate a regular profile ID (for example, a second profile ID) for the received device profile.

In operation 425, the registry ID resolver 130 may register, in the database (DB REGISTRY), a record including the regular profile ID, together with the ID of the device registry and connection information (for example, URL).

In operation 430, the registry ID resolver 130 may transmit, to the profile manager 110, a profile addition request message (PROFILE_ADD_REQ(PROFILE_ID, DEVICE_PROFILE)) (for example, a unicast message). The profile addition request message (PROFILE_ADD_REQ(PROFILE_ID, DEVICE_PROFILE)) may include a device profile and a regular profile ID of the device profile.

In operation 435, the profile manager 110 may register (for example, newly register), in a database (DB DEVICE_PROFILE), a record including the device profile and the regular profile ID of the device profile.

In operation 440, after registration is completed, the profile manager 110 may send, to the registry ID resolver 130, a profile addition confirmation message (PROFILE_ADD_ACK(PROFILE_ID)) so as to notify completion of registration. The profile addition confirmation message (PROFILE_ADD_ACK(PROFILE_ID)) may include the regular profile ID of the device profile.

In operation 445, the registry ID resolver 130 may send, to the device registry, a registry addition confirmation message (REGISTERY_ADD_ACK(PROFILE_ID)) in response to the profile addition confirmation message (PROFILE_ADD_ACK(PROFILE_ID)) so as to notify completion of registration.

A device profile deregistration operation may include operations 450 to 480. The device profile deregistration operation may be performed every time point when the local device is deregistered from the device registry.

In operation 450, the device registry may verify whether the local device is deregistered from the database (DB DEVICE). The device registry may be for verifying whether the device profile of the local device is deregistered from the database (DB DEVICE).

In operation 455, the device registry may transmit, to the registry ID resolver 130, a registry deletion request message (REGISTRY_DEL_REQ(REG. ID)) every time point when a record corresponding to the local device is deleted (for example, deregistered) from the database (DB DEVICE). The registry deletion request message (REGISTRY_DEL_REQ(REGISTRY_ID)) may include the ID of the device registry.

In operation 460, the registry ID resolver 130 may deregister (for example, remove or delete), from the database (DB REGISTRY), a record corresponding to the ID of the device registry. The registry ID resolver 130 may deregister the regular profile ID from the database (DB REGISTRY), together with the ID of the device registry and the connection information (for example, URL).

In operation 465, the registry ID resolver 130 may transmit, to the profile manager 110, a profile deletion request message (PROFILE_DEL_REQ(PROFILE_ID)). The profile deletion request message (PROFILE_DEL_REQ(PROFILE_ID)) may include the regular profile ID of the device profile.

In operation 470, the profile manager 110 may deregister (for example, remove or delete), from the database (DB DEVICE_PROFILE), a record corresponding to the regular profile ID. The profile manager 110 may deregister, from the database (DB DEVICE_PROFILE), the device profile and the regular profile ID of the device profile.

In operation 475, after deletion is completed, the profile manager 110 may send, to the registry ID resolver 130, a profile deletion confirmation message (PROFILE_DEL_ACK(PROFILE_ID)) so as to notify completion of deletion. The profile deletion confirmation message (PROFILE_DEL_ACK(PROFILE_ID)) may include the regular profile ID of the device profile.

In operation 480, the registry ID resolver 130 may send, to the device registry, a registry deletion confirmation message (REGISTERY_DEL_ACK(REGISTRY_ID)) in response to the profile deletion confirmation message (PROFILE_DEL_ACK(PROFILE_ID)) so as to notify completion of deregistration.

Figure 5:
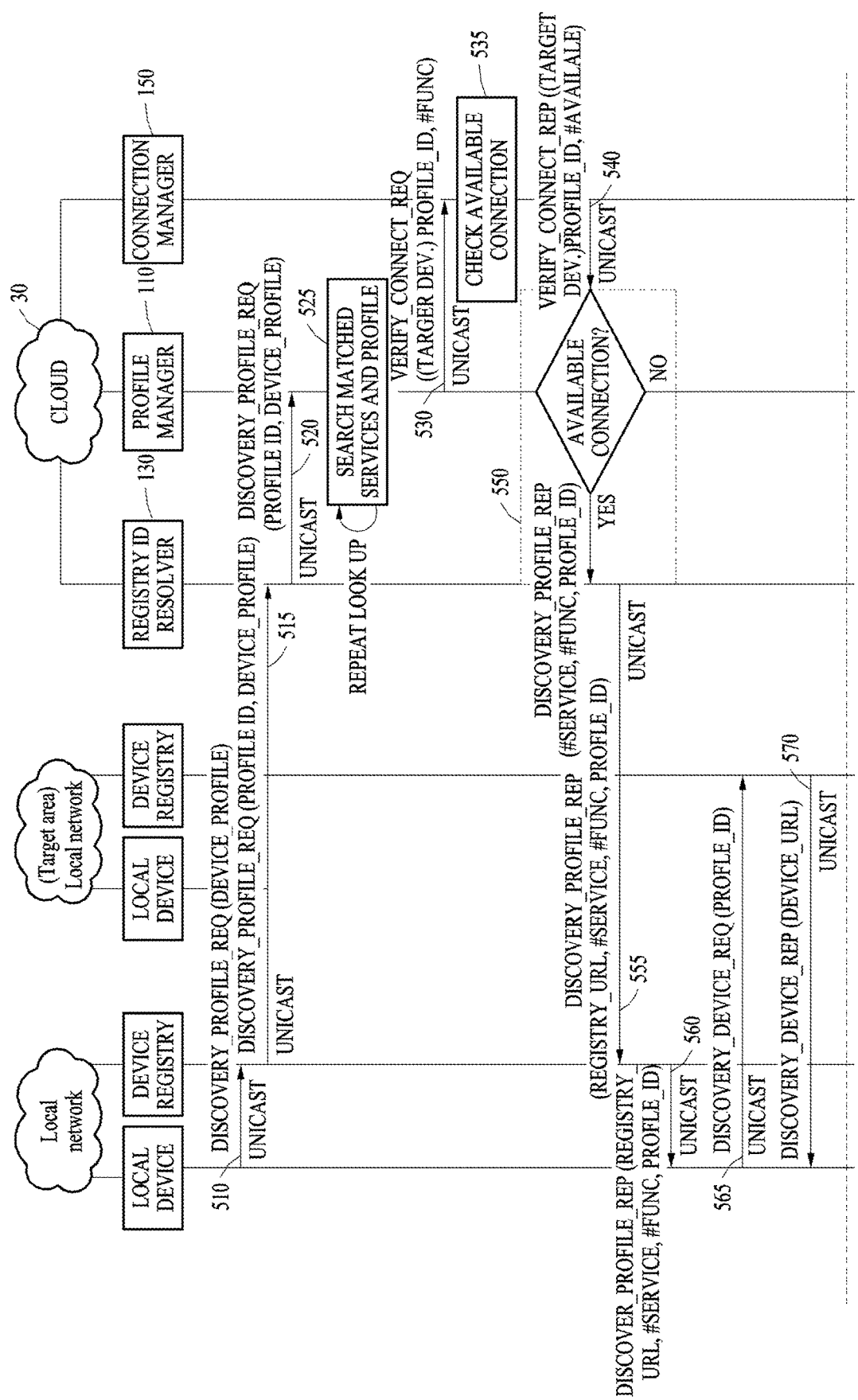
FIG. 5 is a diagram illustrating a device profile discovery operation according to example embodiments.

FIG. 5 is a diagram illustrating a device profile discovery operation according to example embodiments.

FIG. 5 may illustrate an operation of discovering a device profile of a target local device that is capable of interworking through the connection manager 150 existing on the cloud network 30.

In operation 510, a local device may transmit, to a device registry, a discovery profile request message (DISCOVERY_PROFILE_REQ(DEVICE_PROFILE)) for discovering a device profile of a target local device having a function required for service interworking (for example, cooperation). The discovery profile request message (DISCOVERY_PROFILE_REQ(DEVICE_PROFILE)) may include a device profile of the local device that requests service interworking (for example, cooperation).

In operation 515, the device registry may transmit, to the registry ID resolver 130, the discovery profile request message (DISCOVERY_PROFILE_REQ(PROFILE_ID, DEVICE_PROFILE)) further including a corresponding profile ID (for example, a regular profile ID). The discovery profile request message (DISCOVERY_PROFILE_REQ (PROFILE_ID, DEVICE_PROFILE)) transmitted by the device registry to the registry ID resolver 130 may include a device profile and a profile ID of the local device.

In operation 520, the registry ID resolver 130 may forward, to the profile manager 110, the discovery profile request message (DISCOVERY_PROFILE_REQ(PROFILE_ID, DEVICE_PROFILE)) for intelligent discovery (for example, intelligent search) for a related device profile to be used for service interworking.

In operation 525, the profile manager 110 may perform a "(function and service) intelligent discovery operation" (for example, SEARCH MATCHED SERVICES & PROFILE). The "(function and service) intelligent discovery operation" may use the device profile as an input value. The profile manager 110 may search for a match in a database of the profile manager 110. The profile manager 110 may repeatedly perform operation 525 until all related device profiles matching a second database (DB SERVICE PROFILE) are searched in a first database (DB DEVICE PROFILE).

In operation 530, whenever the match is searched in the database of the profile manager 110, the profile manager 110 may transmit, to the connection manager 150, a connection verification request message (VERIFY_CONNECT_REQ (TARGET DEV., PROFILE_ID, #FUNC)) including a profile ID (for example, a regular profile ID) of a device profile of a searched target (for example, a target local device).

In operation 535, the connection manager 150 may search whether a corresponding device profile (for example, the device profile of the searched target local device) is connectable through an "algorithm for verifying whether connection is available" in a database thereof (DB AVAILABLE_CONNECTION). The connection manager 150 may check a result (output: TURE/FALSE) of a database (DB AVAILABLE_CONNECTION) with an ID of the device profile, using a detailed procedure for "CHECK AVAILABLE CONNECTION."

In operation 540, the connection manager 150 may send, to the profile manager 110, a connection verification response message (VERIFY_CONNECT_REP((TARGET DEV.) PROFILE_ID, #AVAILALE)) including the check result.

In operation 550, only when the check result is "TRUE" in the connection verification response message (VERIFY_CONNECT_REP(TARGET DEV., PROF. ID, AVAILALE)), the profile manager 110 may send, to the registry ID resolver 130, a discovery profile response message (DISCOVERY_PROFILE_REP(#SERVICE, #FUNC, PROFFILE_ID)). The discovery profile response message (DISCOVERY_PROFILE_REP(#SERVICE, #FUNC, PROFILE_ID)) may include "searched service name, function name, and profile ID," which is information (for example, a service name, a function name, and a device profile ID) on the target local device.

In operation 555, the registry ID resolver 130 may search for a URL of the device registry of the target local device that is a connection target (for example, connection information for connection with a device registry that manages a device having a connection target profile ID) in a database (DB REGISTRY), and may send, to the device registry that requests discovery, the discovery profile response message (DISCOVERY_PROFILE_REP(REGISTRY_URL, #SERVICE, #FUNC, PROFILE_ID)) to which the URL of the device registry is further added.

In operation 560, the device registry may forward, to the local device that requests discovery, the discovery profile response message (DISCOVERY_PROFILE_REP(REGISTRY_URL, #SERVICE, #FUNC, PROFILE_ID)).

In operation 565, the local device may transmit, to the device registry that manages the target local device, a discovery device request message (DISCOVERY_DEVICE_REQ(PROFILE_ID)) including the profile ID of the target local device, using the URL of the device registry in which the target local device is registered. The discovery device request message (DISCOVERY_DEVICE_REQ (PROFILE_ID)) may be for requesting information on the target local device.

In operation 570, the device registry may send a discovery device response message (DISCOVERY_DEVICE_REP (DEVICE_URL)) to the local device that requests discovery. The discovery device response message (DISCOVERY_DEVICE_REP(DEVICE_URL)) may include the URL of the target local device (that is, location information for connection). The local device may acquire all information for connecting and interworking with the target local device. The local device that receives the information may start connection between devices and a connection registration procedure.

Figure 6:
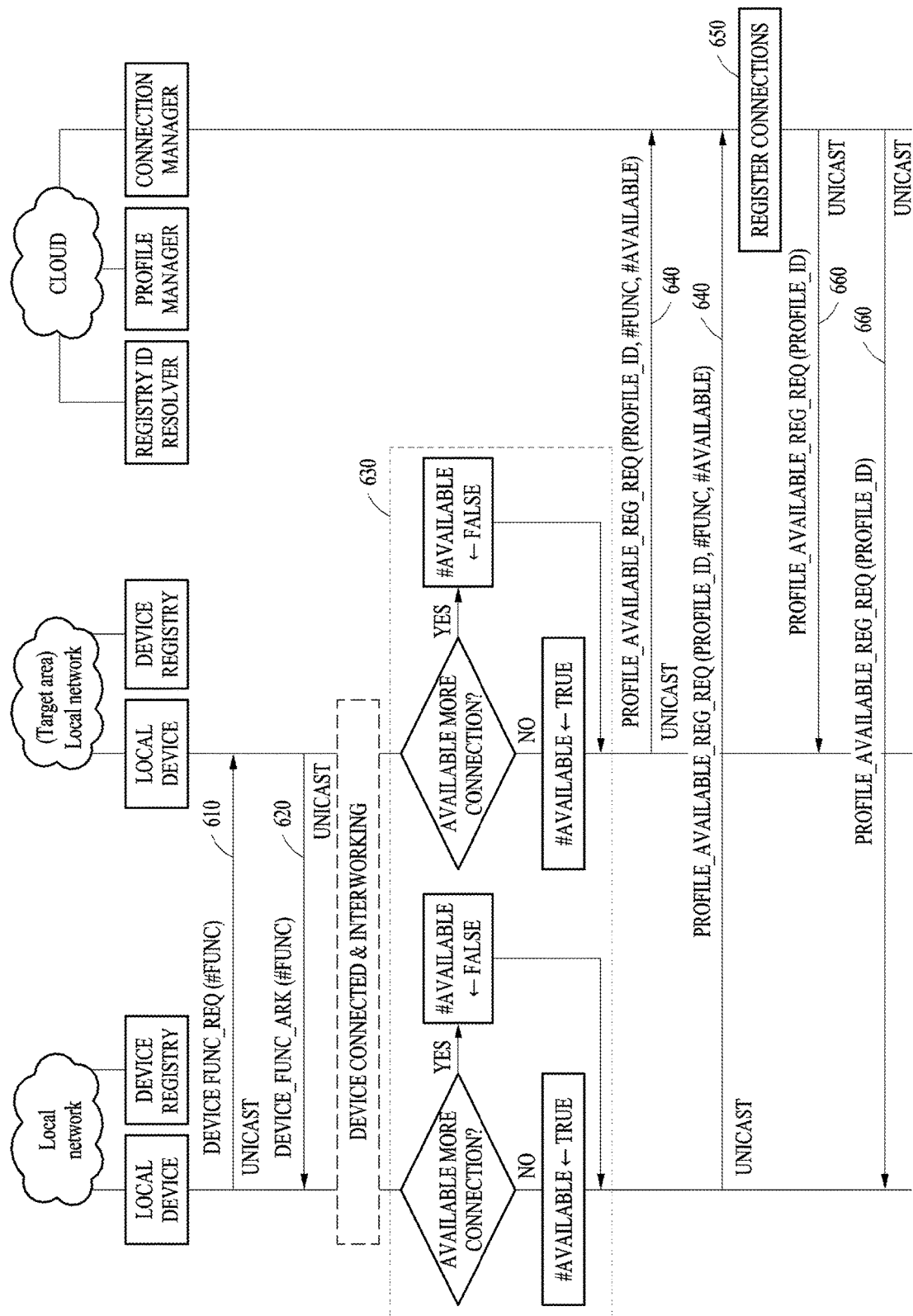
FIG. 6 is a diagram illustrating device connection and connection registration according to example embodiments.

FIG. 6 is a diagram illustrating device connection and connection registration according to example embodiments.

FIG. 6 may relate to a procedure for registering a connection state when two local devices have new connection for service interworking.

A local device may start a connection procedure with a target local device acquired through a connection target device profile discovery procedure and a connection information registration procedure with the connection manager 150 belonging to a cloud, as illustrated in FIG. 6.

In operation 610, the local device that acquires a URL of the target local device that is a connection target through a discovery request procedure may transmit, to the target local device, a device function request message (DEVICE_FUNC_REQ(#FUNC)) including a desired (or required) function for service interworking (for example, cooperation), through the URL of the target local device.

In operation 620, the target local device may send, to the local device, a device function confirmation message (DEVICE_FUNC_ACK(#FUNC)) so as to notify that it is prepared to be connected to the requested function.

In operation 630, when respective local devices are interconnected, it may be determined whether another connection with a connected function is available. The respective local devices may store "TRUE" for a value of #AVAILABLE when additional connection is available, and "FALSE" for the value of #AVAILABLE when additional connection is unavailable.

In operation 640, the respective local devices may transmit, to the connection manager 150, an additional profile registration request message (PROFILE_AVAILABLE_REG_REQ(PROFILE_ID, #FUNC, #AVAILABLE)).

In operation 650, the connection manager 150 may update the database (DB AVAILABLE_CONNECTION) to include whether additional connection with a corresponding function is available when a corresponding profile ID (for example, a regular profile ID) exists, and may register, as a new item, whether additional connection with the corresponding function is available when no corresponding profile ID exists.

In operation 660, when registration is completed, the connection manager 150 may send, to the respective local devices, an additional profile registration confirmation message (PROFILE_AVAILABLE_REG_ACK(PROFILE ID)), thereby notifying whether additional connection is available is updated/newly registered.

Figure 8:
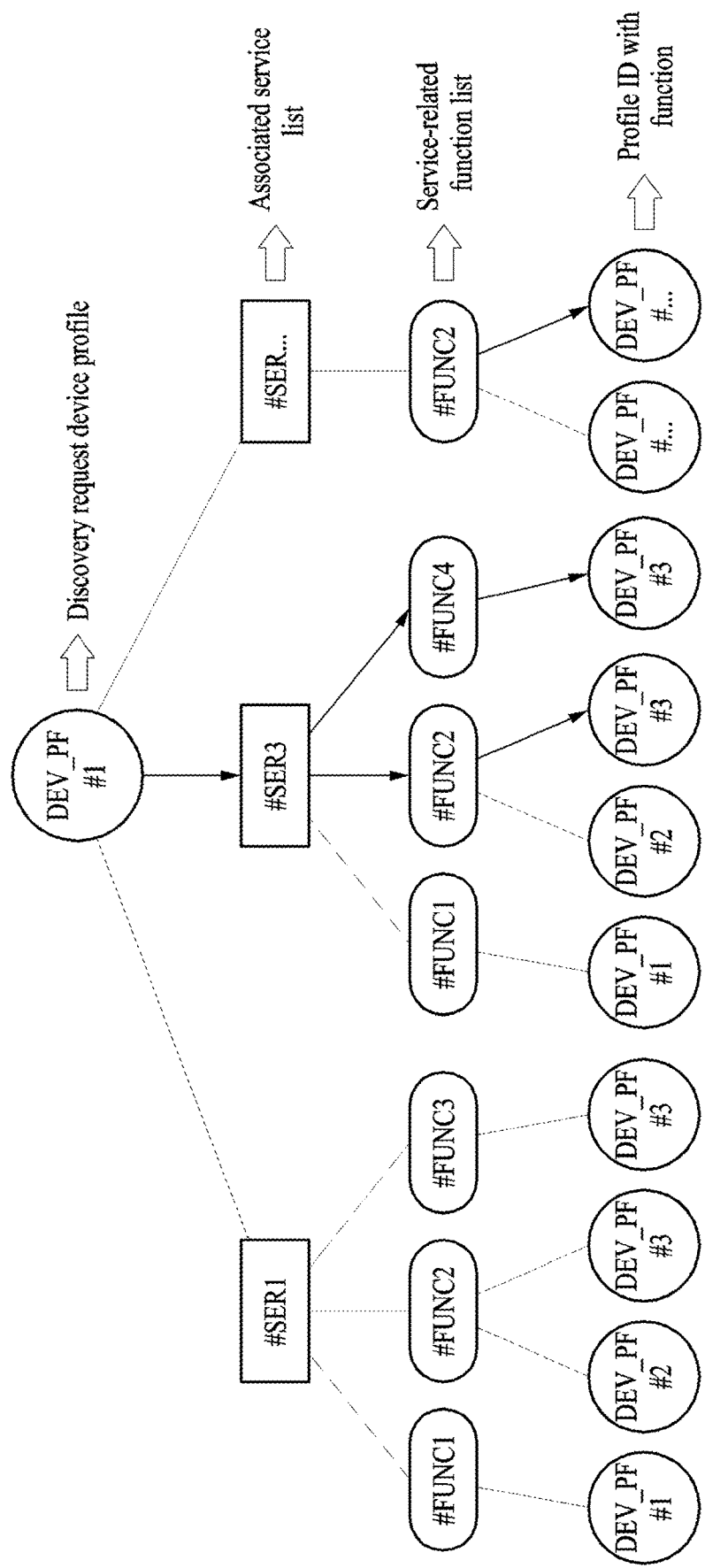

FIGS. 7 and 8 are diagrams illustrating an example of an operation of discovering a device profile according to example embodiments.

As illustrated in FIGS. 7 and 8, the profile manager 110 may discover a profile of another local device having a function that a local device that requests discovery for service interworking does not have. In FIG. 7, a left side may be an example of a first database (DB DEVICE_PROFILE), and a right side may be an example of a second database (DB SERVICE_PROFILE).

A local device may request a profile list of a connectable target local device for service interworking (for example, cooperation) for a specific purpose. The local device may transmit a device profile thereof. Even when the local device that requests the profile list does not specify a device profile of the target local device for interworking, the profile manager 110 may search for, in the second database (DB_SERVICE_PROFILE), a service profile having the same function (FUNC) included in the device profile of the local device that requests the profile list to find out a service list, and may connect device profiles of all target local devices having a function (FUNC) on the found service profile to generate a data structure with a tree form, as illustrated in FIG. 8.

For example, when a service #3 associated with a device profile #1 of the local device that requests the profile list is selected based on the data structure of FIG. 8, a target local device having functions (FUNC) #2 and #3 excluded from a profile of a local device connected with the service #3 may be finally searched. A device profile #3 of the final target local device searched in this manner may include both FUNC #2 and FUNC #3, and thus the local device may attempt connection with the target local device corresponding to the device profile #3.

Figure 9:
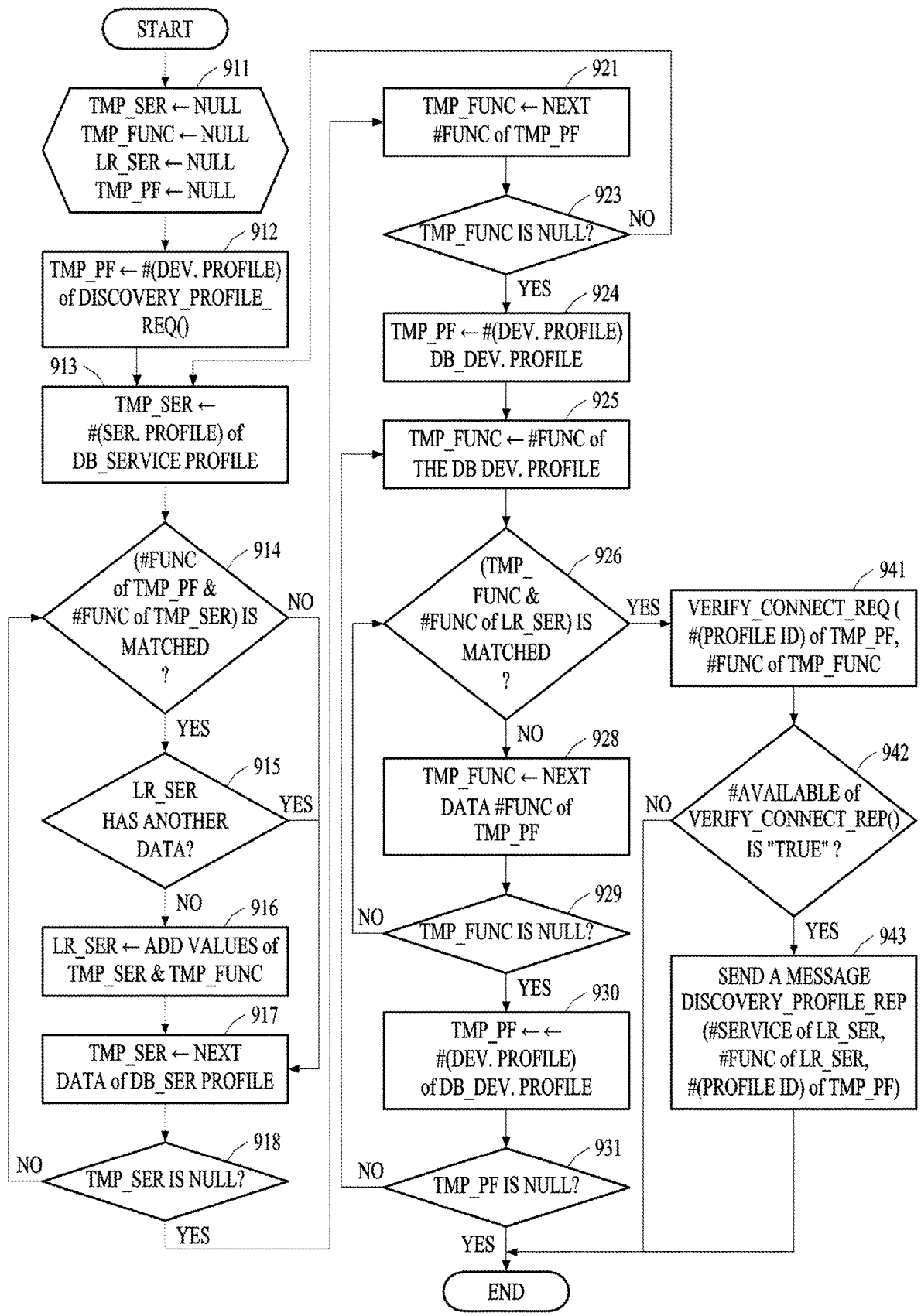
FIG. 9 is a diagram illustrating a function and service intelligent discovery operation according to example embodiments.

FIG. 9 is a diagram illustrating a function and service intelligent discovery operation according to example embodiments.

In FIG. 9, it is assumed that registration of a function list is completed in the form illustrated in FIG. 7, and it is assumed that a uniform name is collectively used for function and service names existing as attributes within a profile and service data structure. The function and service names are represented as "#FUNC NUMBER" or "#SERVICE NUMBER" for convenience.

In operations 911 to 918, the profile manager 110 may search for service profiles one by one in a DB_SERVICE_PROFILE, using a device profile of a local device that requests discovery, while verifying whether the service profiles have the same function, and may an operation of storing all corresponding services in an LR_SER list when the service profiles have the same function. The profile manager 110 may receive, from the registry ID resolver 130, a discovery profile request message (DISCOVERY_PROFILE_REQ(PROFILE ID, DEV. PROFILE)). The profile manager 110 may store the device profile in a temporary variable (TMP_PF), store a function within the device profile in a temporary variable (TMP_FUNC), and store a first service item of the DB SERVICE PROFILE in a temporary variable (TMP_SER), using the discovery profile request message (DISCOVERY_PROFILE_REQ(PROFILE ID, DEV. PROFILE)). The profile manager 110 may store, in a temporary variable (LR_SER), all services including a function matching "#FUNC NUMBER" of the received profile.

In operations 921 to 943, the profile manager 110 may compare a function on a service stored in the stored LR_SER list to functions of a profile stored in a DB_DEVICE_PROFILE one by one, verify whether additional connection is available (VERIFY_CONNECT_REQ) when the functions are the same, and transmit, to the local device that requests discovery, the searched device profile when connection is available. The profile manager 110 may transmit, to the connection manager 150, a connection verification request message (VERIFY_CONNECT_REQ(TARGET DEV., PROF. ID, #FUNC)) whenever device profiles of "#FUNC NUMBER" of the services stored in the temporary variable (LR_SER) and matching "#FUNC NUMBER" belonging to the DB DEVICE PROFILE are checked, and may receive, from the connection manager 150, a connection verification response message (VERIFY_CONNECT_REP(TARGET DEV., PROF. ID, AVAILALE)) including a result as to whether connection is available. When a value of #AVAILABLE is "TRUE," the profile manager 110 may send, to the registry ID resolver 130, a discovery profile response message (DISCOVERY_PROFILE_REP(#SERVICE, #FUNC, DEV. PROF. ID)) including a corresponding service name, a corresponding function name, and a corresponding profile ID.

The above-described operation may be repeated until whether all profiles registered in the DB DEVICE PROFILE match or not is verified.

Figure 10:
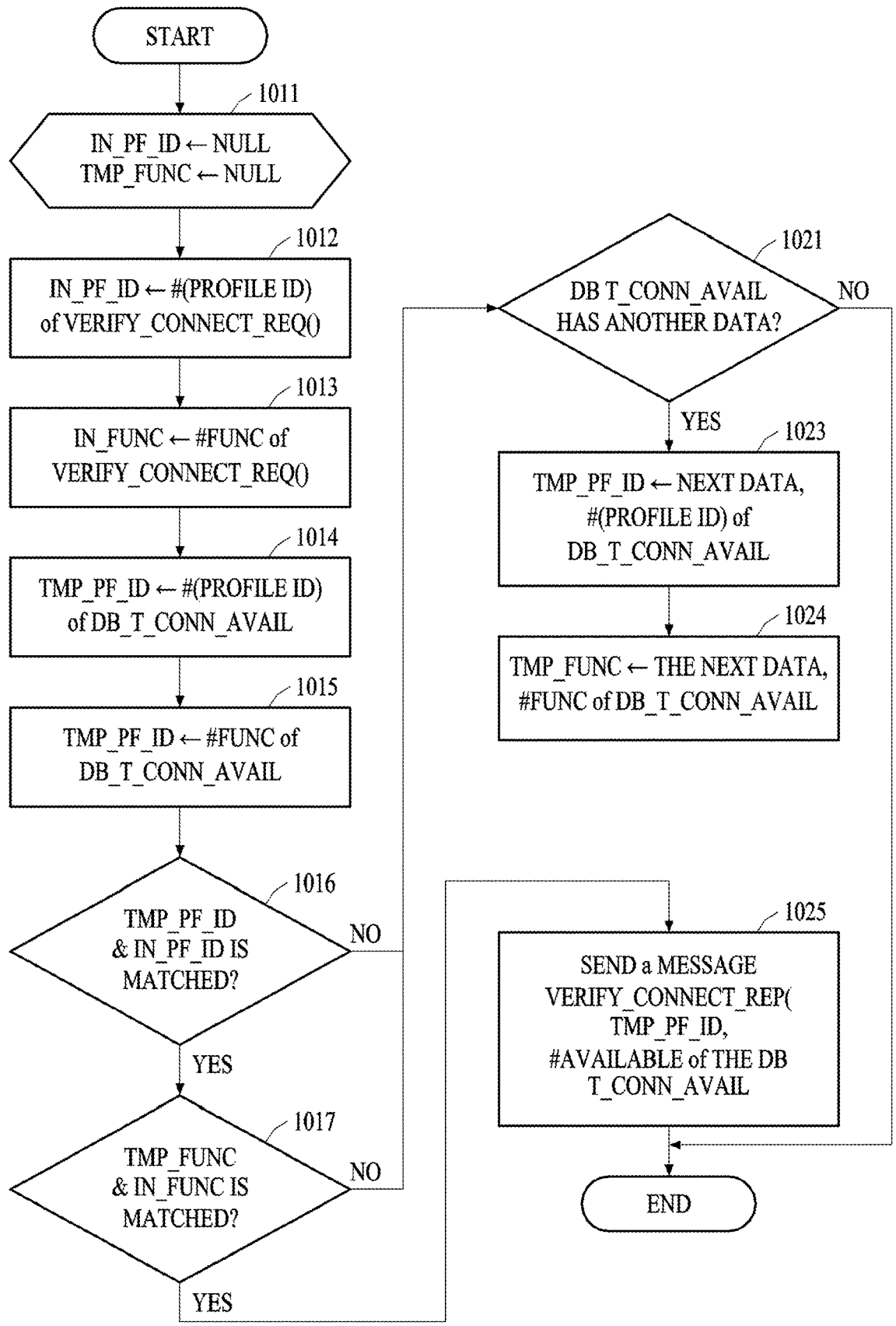
FIG. 10 is a diagram illustrating an operation of verifying whether connection is available according to example embodiments.

FIG. 10 is a diagram illustrating an operation of verifying whether connection is available according to example embodiments.

Whenever a connection verification request message (VERIFY_CONNECT_REQ (MATCHED PROFILE ID, "#FUNC NUMBER")) is received from the profile manager 110, the connection manager 150 may perform an operation of verifying whether connection is available. The operation of verifying whether connection is available may include operations 1011 to 1025.

When there is a received connection verification request message (VERIFY_CONNECT_REQ(TARGET DEV., PROF. ID, #FUNC)), the connection manager 150 may store a device profile ID and a corresponding function name ("#FUNC NUMBER") in a temporary variable (IN_PF_ID) and a temporary variable (IN_FUNC), respectively.

The connection manager 150 may search whether a profile ID registered in a DB AVAILABLE_CONNECTION matches a connected function name ("#FUNC NUMBER"), allow a VERIFY_CONNECT_REP (TARGET DEV. PROF.

ID, AVAILALE) message to include a value of a result as to whether connection with a matched function ("#FUNC NUMBER") is available, and send the value to the profile manager 110.

When a PROFILE_AVAILABLE_REG_REQ (PROFILE ID, #FUNC, #AVAILABLE) message is received from a local device, the connection manager 150 may newly register the value in the DB AVAILABLE_CONNECTION or update the DB AVAILABLE_CONNECTION to include the value.

In addition, the connection manager 150 may send, to the local device, a PROFILE_AVAILABLE_REG_ACK (PROFILE ID) message.

As described above, example embodiments may enable efficient management in providing various services through intelligent discovery of a mutual device profile for autonomous device cooperation. For example, even when a function of a device is insufficient, support for the insufficient function may be received by a request between users from a device with a sufficient resource connected to the Internet, thereby enabling cooperation for various services, and deriving various service results.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The example embodiments described herein may be implemented using hardware components, software components, or a combination thereof. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The method according to the above-described example embodiments may be recorded in non-transitory computer-readable media including program instructions to implement various operations which may be performed by a computer. The media may also include, alone or in combination with the program instructions, data files, data structures, and the like. The program instructions recorded on the media may be those specially designed and constructed for the purposes of the example embodiments, or they may be of the well-known kind and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as code produced by a compiler, and files containing higher level code that may be executed by the computer using an interpreter. The described hardware devices may be configured to act as one or more software modules in order to perform the operations of the above-described example embodiments, or vice versa.

The described hardware devices may be configured to act as one or more software modules in order to perform the operations of the above-described example embodiments, or vice versa.

While this disclosure includes example embodiments, it will be apparent to one of ordinary skill in the art that various changes in form and details may be made in these example embodiments without departing from the spirit and scope of the claims and their equivalents. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A remote device profile management method for service interworking, the remote device profile management method comprising:
receiving a request to register a device profile of a local device for a cloud network; generating a regular profile identification (ID) for the device profile;
registering a record comprising the regular profile ID along with ID and connection information of a device registry in which the local device is registered;
registering a record comprising the regular profile ID and the device profile;
sending a confirmation message notifying that registration is complete, after registration of the device profile for the cloud network is completed;
updating a profile ID of the device profile stored in the device registry from tentative to regular in response to the confirmation message;
verifying whether the local device is in an active state through a timer for the local device;

transmitting a discovery request message to the local device whenever the timer expires;

resetting the timer when a discovery response message is received from the local device in response to the discovery request message; and performing deregistration of the device profile for the cloud network, when a profile deregistration message is received, or when no discovery response message is received from the local device.

\* \* \* \* \*